US010369901B2

(12) United States Patent
Murakami et al.

(10) Patent No.: US 10,369,901 B2
(45) Date of Patent: Aug. 6, 2019

(54) VEHICLE SEAT SLIDING DEVICE

(71) Applicant: AISIN SEIKI KABUSHIKI KAISHA, Kariya-shi (JP)

(72) Inventors: Yuta Murakami, Nagoya (JP); Toshiaki Nagata, Chita-gun (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 132 days.

(21) Appl. No.: 15/629,049

(22) Filed: Jun. 21, 2017

(65) Prior Publication Data
US 2017/0368961 A1 Dec. 28, 2017

(30) Foreign Application Priority Data
Jun. 23, 2016 (JP) .................. 2016-124975

(51) Int. Cl.
*B60N 2/06* (2006.01)
*B60N 2/07* (2006.01)

(52) U.S. Cl.
CPC .............. *B60N 2/067* (2013.01); *B60N 2/07* (2013.01); *B60N 2/0705* (2013.01); *B60N 2/0722* (2013.01); *B60N 2/0702* (2013.01)

(58) Field of Classification Search
CPC ........ B60N 2/067; B60N 2/0722; B60N 2/07; B60N 2/0705; B60N 2/0702
See application file for complete search history.

(56) References Cited

U.S. PATENT DOCUMENTS

| 5,342,013 | A  | * | 8/1994  | Ito ..................... | B60N 2/067 248/424 |
| 5,762,309 | A  | * | 6/1998  | Zhou ................... | B60N 2/919 248/429 |
| 6,290,199 | B1 | * | 9/2001  | Garrido ................ | B60N 2/0232 248/424 |
| 7,325,851 | B2 | * | 2/2008  | Ito ..................... | B60N 2/067 248/429 |
| 7,597,303 | B2 | * | 10/2009 | Kimura ................ | B60N 2/067 248/424 |
| 8,061,756 | B2 | * | 11/2011 | Kimata ................ | B60N 2/067 248/429 |
| 9,266,448 | B2 | * | 2/2016  | Urban .................. | B60N 2/0224 |

(Continued)

FOREIGN PATENT DOCUMENTS

JP 2007-55557 3/2007
JP 2010-47091 3/2010

*Primary Examiner* — Eret C McNichols
(74) *Attorney, Agent, or Firm* — Oblon, McClelland, Maier & Neustadt, L.L.P.

(57) ABSTRACT

A vehicle seat sliding device includes: a lower rail fixed to a vehicle floor; an upper rail slidably engaging with the lower rail and supports a vehicle seat upward; a nut member fixed to a first rail which configures one side of the lower rail and the upper rail; a screw rod screwed into the nut member; a drive unit rotating the screw rod; and a support supporting the screw rod on a second rail which configures the other side of the lower rail and the upper rail. The support includes a holding member that is provided with an insertion hole into which the screw rod is inserted and that is fixed to the second rail, and a holding nut that is provided with a through-hole into which the screw rod is inserted and that is screwed to a screwing portion provided on the screw rod or the holding member.

7 Claims, 6 Drawing Sheets

(56) References Cited

U.S. PATENT DOCUMENTS

| | | | |
|---|---|---|---|
| 10,220,730 B2* | 3/2019 | Nagata | B60N 2/067 |
| 2006/0237619 A1* | 10/2006 | Nakamura | B60N 2/0232 |
| | | | 248/429 |
| 2008/0078908 A1* | 4/2008 | Koga | B60N 2/0232 |
| | | | 248/298.1 |
| 2009/0243327 A1* | 10/2009 | Koga | B60N 2/067 |
| | | | 296/65.15 |
| 2010/0065708 A1* | 3/2010 | Koga | B60N 2/067 |
| | | | 248/429 |
| 2010/0219813 A1* | 9/2010 | Ito | B60N 2/0232 |
| | | | 324/207.22 |
| 2010/0288903 A1* | 11/2010 | Koga | B60N 2/0232 |
| | | | 248/429 |
| 2010/0320352 A1* | 12/2010 | Weber | B60N 2/067 |
| | | | 248/429 |
| 2011/0079699 A1* | 4/2011 | Tarusawa | B60N 2/067 |
| | | | 248/430 |
| 2011/0095160 A1* | 4/2011 | Kimura | B60N 2/067 |
| | | | 248/429 |
| 2011/0200409 A1* | 8/2011 | Toosky | F16B 19/1054 |
| | | | 411/166 |
| 2013/0186217 A1* | 7/2013 | Enokijima | B60N 2/067 |
| | | | 74/89.33 |
| 2016/0039313 A1* | 2/2016 | Kuroda | B60N 2/0722 |
| | | | 248/429 |
| 2016/0059739 A1* | 3/2016 | Tsuji | B60N 2/0705 |
| | | | 248/429 |
| 2016/0059740 A1* | 3/2016 | Shimizu | B60N 2/06 |
| | | | 248/429 |
| 2016/0075259 A1* | 3/2016 | Couasnon | B60N 2/067 |
| | | | 297/344.1 |
| 2018/0029504 A1* | 2/2018 | Nagata | B60N 2/067 |
| 2018/0304777 A1* | 10/2018 | Ito | B60N 2/067 |

* cited by examiner

VEHICLE SEAT SLIDING DEVICE

CROSS REFERENCE TO RELATED APPLICATIONS

This application is based on and claims priority under 35 U.S.C. § 119 to Japanese Patent Application 2016-124975, filed on Jun. 23, 2016, the entire contents of which are incorporated herein by reference.

TECHNICAL FIELD

This disclosure relates to a vehicle seat sliding device equipped with a drive source.

BACKGROUND DISCUSSION

In the related art, there is a seat sliding device for a vehicle that includes a lower rail which is fixed to a vehicle floor and an upper rail which slidably engages with the lower rail and supports a seat upward. In such a seat sliding device, the drive force from a motor or the like as a drive source causes the upper rail to slide with respect to the lower rail.

For example, JP2007-55557A (Reference 1) discloses a seat sliding device that includes a screw rod supported by an upper rail in a rotatable manner and a nut member fixed to a lower rail. The seat sliding device has a configuration in which drive of a motor rotates the screw rod screwed into the nut member.

Further, the seat sliding device of Reference 1 includes a bearing member that holds the screw rod in a rotatable manner at a position between a gear box and the nut member in a longitudinal direction of the upper rail. Specifically, the bearing member is fixed to the upper rail and has a support provided with an insertion hole into which the screw rod is inserted. The support is configured to be pinched between a pair of washers provided on the screw rod and thereby to receive a load in an axial direction thereof.

However, in a case of such a seat sliding device including a bearing member that supports an intermediate portion of the screw rod, there is a possibility that a biased load is generated between the screw rod and the support of the bearing member when the screw rod supported on the bearing member is inclined and rotated. In this manner, there is a concern that operating noise will be generated, or a smooth operation of the screw rod is interrupted.

Thus, a need exists for a vehicle seat sliding device which is not susceptible to the drawback mentioned above.

SUMMARY

It is preferable that a vehicle seat sliding device according to an aspect of this disclosure includes: a lower rail that is fixed to a vehicle floor; an upper rail that slidably engages with the lower rail and supports a vehicle seat upward; a nut member fixed to a first rail which configures one side of the lower rail and the upper rail; a screw rod that is screwed into the nut member; a drive unit that rotates the screw rod; and a support that supports the screw rod on a second rail which configures the other side of the lower rail and the upper rail. The support includes a holding member that is provided with an insertion hole into which the screw rod is inserted and that is fixed to the second rail, and a holding nut that is provided with a through-hole into which the screw rod is inserted and that is screwed to a screwing portion provided on the screw rod or the holding member. The holding nut is configured to pinch, in cooperation with a pinch portion provided on one side of the screw rod and the holding member which have the screwing portion, a pinch target portion provided on the other side of the screw rod and the holding member. The pinch target portion has a first curved surface that comes into contact with the holding nut in a slidable manner, and a second curved surface that comes into contact with the pinch portion in a slidable manner. The first curved surface and the second curved surface are configured to form a part of spherical surfaces that are concentric with each other.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment of a vehicle seat sliding device will be described with reference to the figures.

Figure 1:
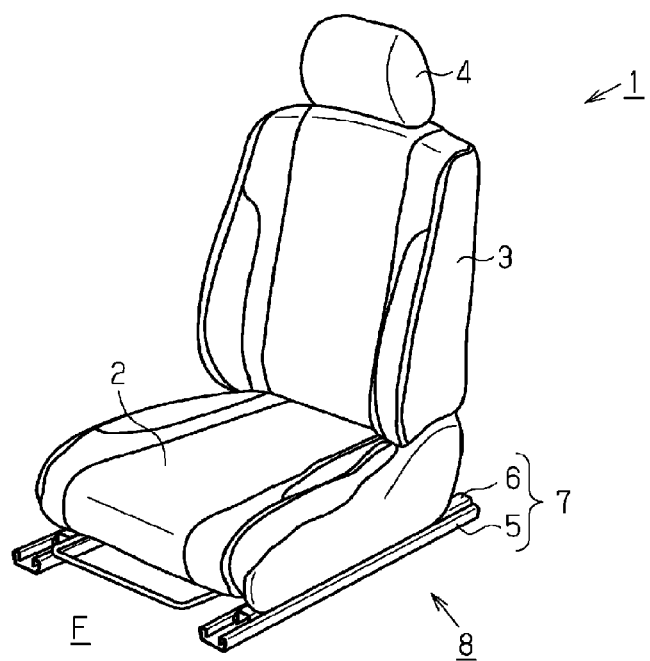
FIG. 1 is a perspective view of a seat.

As illustrated in FIG. 1, the seat 1 for a vehicle includes a seat cushion 2 and a seatback 3 that is tiltably provided with respect to a rear end portion of the seat cushion 2. A headrest 4 is provided on an upper end of the seatback 3.

In addition, a pair of right and left lower rails 5 extending in a vehicle frontward-rearward direction is provided on a floor F of the vehicle. Further, upper rails 6 are mounted on the respective lower rails 5, and the upper rails engage with the lower rails 5 and are slidable on the corresponding lower rails 5 in an extending direction thereof. The seat 1 of the embodiment is supported upward from a seat sliding rail 7 configured to have the lower rail 5 and the upper rail 6.

In other words, the seat 1 of the embodiment is fixed to the upper rail 6 in a state in which the seat straddles on the right and left seat sliding rails 7. In the embodiment, the upper rail 6 relatively moves with respect to the lower rail 5, and thereby a seat sliding device 8 that is capable of adjusting front and rear positions of the seat 1 is formed.

Figure 2:
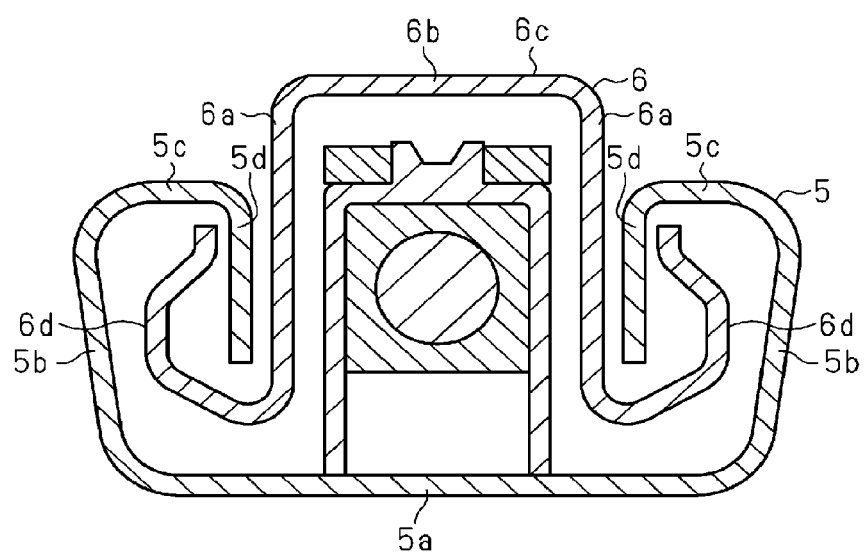
FIG. 2 is a sectional view of a lower rail and an upper rail.

As illustrated in FIG. 2, the lower rail 5 has a flat plate-shaped bottom wall portion 5a that is fixed to the floor F (refer to FIG. 1) of the vehicle. In addition, a pair of outer wall portions 5b is provided in an upright manner to face each other at both ends of the bottom wall portion 5a in a width direction thereof (a horizontal direction in FIG. 2). Further, upper wall portions 5c having a flange shape are formed to extend toward the inner side in the width direction on the upper ends (end portions of the upper end in FIG. 2) of the outer wall portions 5b. Inner wall portions 5d folded downward are formed at distal ends of the upper wall portions 5c.

The upper rail 6 has a pair of side wall portions 6a that face each other in the width direction. In addition, the upper rail 6 has plate-shaped upper wall portions 6b that are connected to both of the side wall portions 6a. The upper rail 6 of the embodiment has an upper rail main body 6c having a substantially U-shaped cross-section, which is formed by both of the side wall portions 6a and the upper wall portion 6b and is disposed between both of the inner wall portions 5d on the lower rail 5 side. Thus, the upper rail is mounted on the lower rail 5.

In addition, the upper rail 6 has folded portions 6d that are folded upward on the outer sides in the width direction from the lower end of the side wall portion 6a. The folded portion 6d is disposed in a space surrounded by the outer wall portion 5b, the upper wall portion 5c, and the inner wall portion 5d which configure the lower rail 5, and thereby the folded portion is restricted from relatively moving in an upward direction and the width direction with respect to the lower rail 5.

A plurality of rolling elements (not illustrated) are interposed to face each other in a rail width direction between the outer wall portion 5b of the lower rail 5 and the folded portion 6d of the upper rail 6. The rolling elements roll to come into sliding contact with the outer wall portion 5b of the lower rail 5 and the folded portion 6d of the upper rail 6, and thereby smooth relative movement of the upper rail 6 is secured with respect to the lower rail 5.

Figure 3:
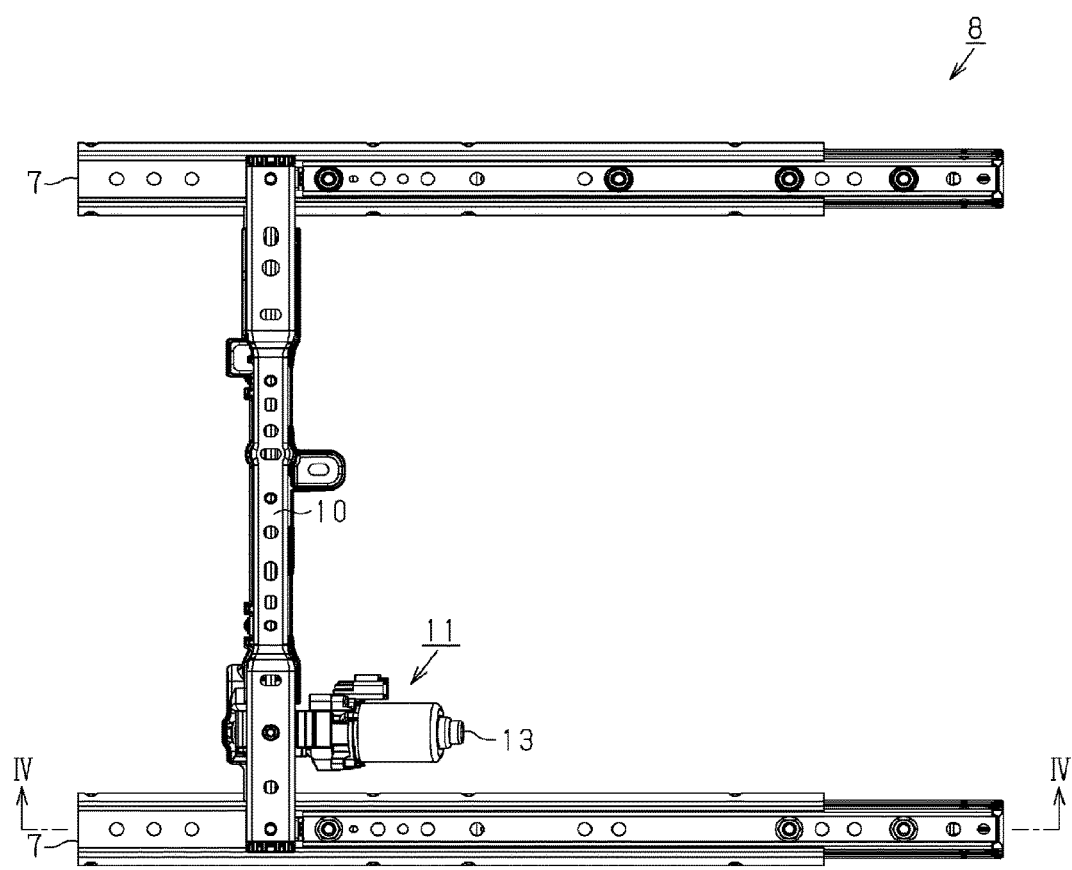
FIG. 3 is a top view of a seat sliding device.
Figure 4:
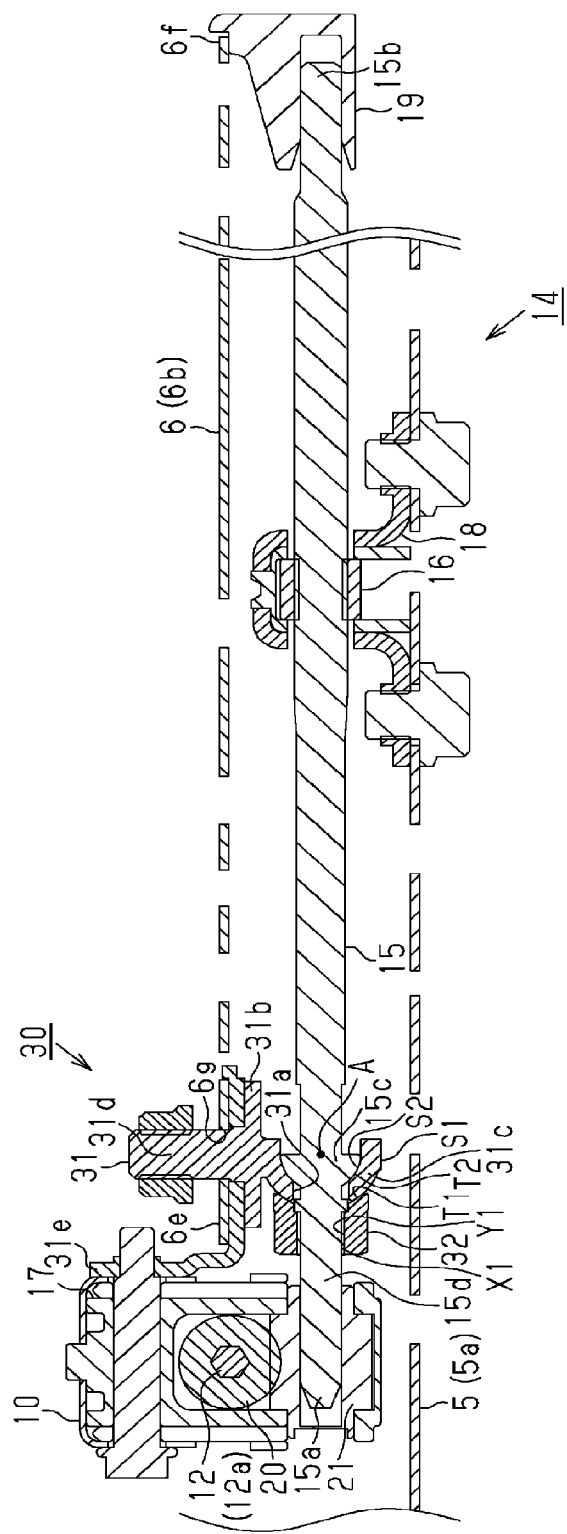
FIG. 4 is a sectional view of the seat sliding device (a cross-section taken along line IV-IV in FIG. 3).

In addition, as illustrated in FIGS. 3 and 4, the seat sliding device 8 of the embodiment includes a bracket 10 that straddles both of the seat sliding rails 7, an actuator 11 supported by the bracket 10, and a transmission shaft 12 that is rotated by the actuator 11.

In the seat sliding device 8 of the embodiment, the actuator 11 is suspended on a lower side of the bracket 10. In addition, the transmission shaft 12 extends in a longitudinal direction of the bracket 10 having a substantially elongated plate shape in a substantially orthogonal state to the seat sliding rails 7. Further, the actuator 11 of the embodiment rotates the transmission shaft 12 with the motor 13 as the drive source. The seat sliding device 8 of the embodiment has a configuration in which drive force of the motor 13 is transmitted via the transmission shaft 12 to a rail drive mechanism 14 interposed between the lower rails 5 and the upper rails 6 which configure the seat sliding rails 7.

As illustrated in FIG. 4, the rail drive mechanism 14 of the embodiment includes a screw rod 15 extending in an extending direction of the seat sliding rail 7, a nut member 16 that is screwed to the screw rod 15, and a gear box 17 that changes rotation of the transmission shaft 12 described above into rotation of the screw rod 15. The nut member 16 of the embodiment is fixed to the bottom wall portion 5a of the lower rail 5 via a fixing bracket 18. In addition, the gear box 17 of the embodiment is fixed to a front end portion 6e (end portion on the left side in FIG. 4) of the upper rail 6. The screw rod 15 of the embodiment has a configuration in which, in a state in which one end side (front end portion 15a) of the screw rod is connected to the gear box 17, the other end side (rear end portion 15b) thereof is supported by a bearing member 19 provided in a rear end portion 6f (end portion on the right side in FIG. 4) of the upper rail 6.

In other words, in the embodiment, the lower rail 5 configures a first rail and the upper rail 6 configures a second rail. In addition, the gear box 17 of the embodiment includes a first gear 20 that is connected to a shaft end portion 12a of the transmission shaft 12, and a second gear 21 that is connected to the front end portion 15a of the screw rod 15 in a state of meshing with the first gear 20. In the seat sliding device 8 of the embodiment, the drive force of the actuator 11 (motor 13) is transmitted to the screw rod 15 in this manner, and thus a drive unit that rotates the screw rod 15 is formed.

In addition, in the rail drive mechanism 14 of the embodiment, the screw rod 15 screwed into the nut member 16 rotates, and thereby the screw rod 15 relatively moves with respect to the nut member 16 in the axial direction. The seat sliding device 8 of the embodiment has a configuration in which the upper rail 6 that supports the screw rod 15 moves forward and rearward with respect to the lower rail 5 provided with the nut member 16.

Next, a support of the screw rod 15 provided on the seat sliding device 8 of the embodiment will be described.

Figure 5:
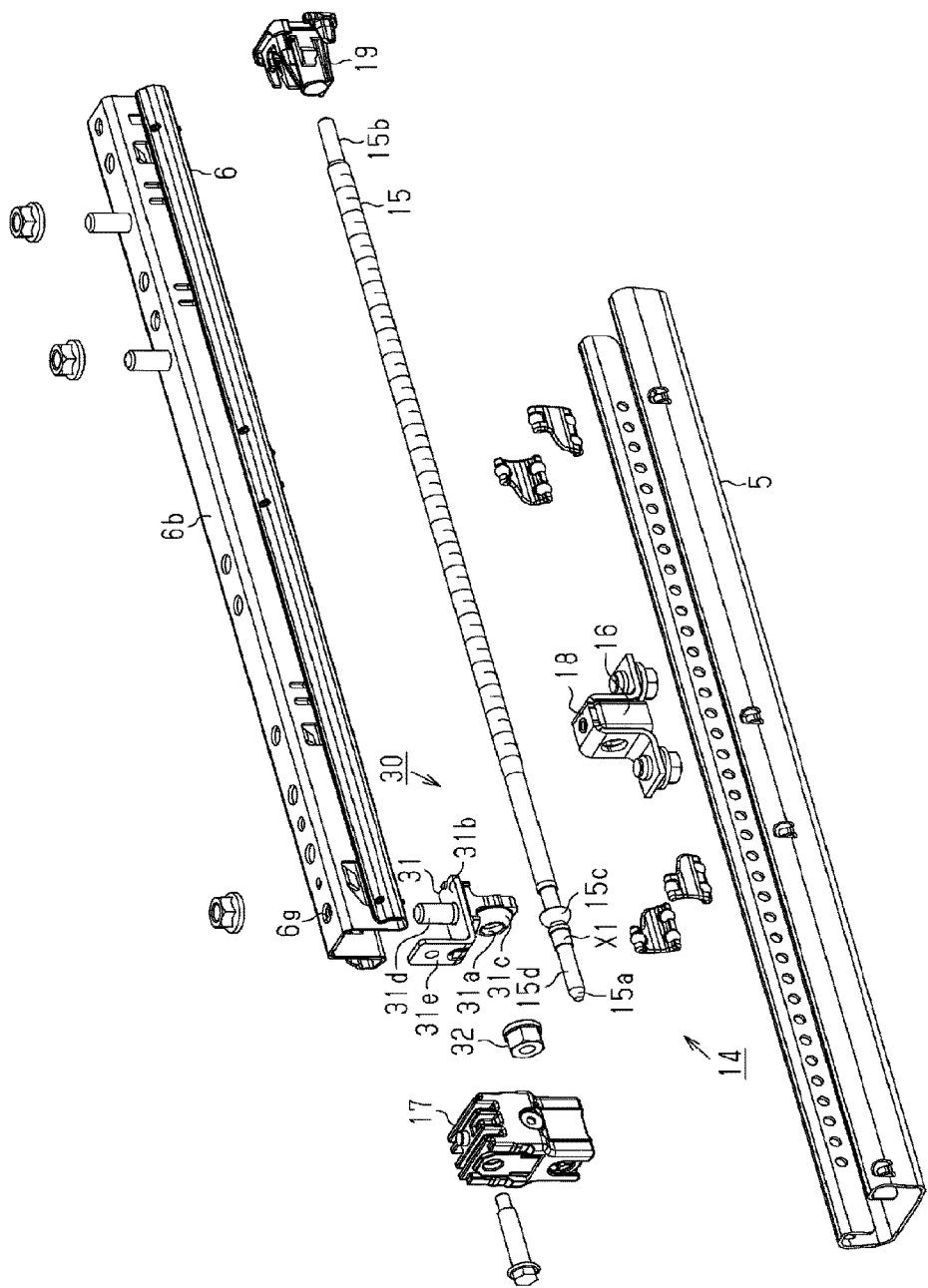
FIG. 5 is an exploded perspective view of the seat sliding device.

As illustrated in FIGS. 4 and 5, in the seat sliding device 8 of the embodiment, a support 30 that supports the screw rod 15 by the upper rail 6 is provided between the front end portion 15a and the rear end portion 15b of the screw rod 15.

To be more specific, the seat sliding device 8 of the embodiment includes a holding member 31 that is provided with an insertion hole 31a into which the screw rod 15 is inserted and that is fixed to the upper wall portion 6b of the upper rail 6. In addition, the screw rod 15 of the embodiment is provided with a bulging portion 15c bulging outward in a radial direction, and a screwing portion X1 provided at a position separated from the bulging portion 15c in the axial direction. Further, the seat sliding device 8 of the embodiment includes a holding nut 32 that is screwed to the screwing portion X1 of the screw rod 15 in a state in which the screw rod 15 is inserted into a through-hole (screwing hole) Y1 having female threads on an inner circumferential surface. In the seat sliding device 8 of the embodiment, an insertion-hole forming portion 31c of the holding member 31 is pinched between the bulging portion 15c of the screw rod 15 and the holding nut 32, and thereby the support 30 is formed.

Figure 6:
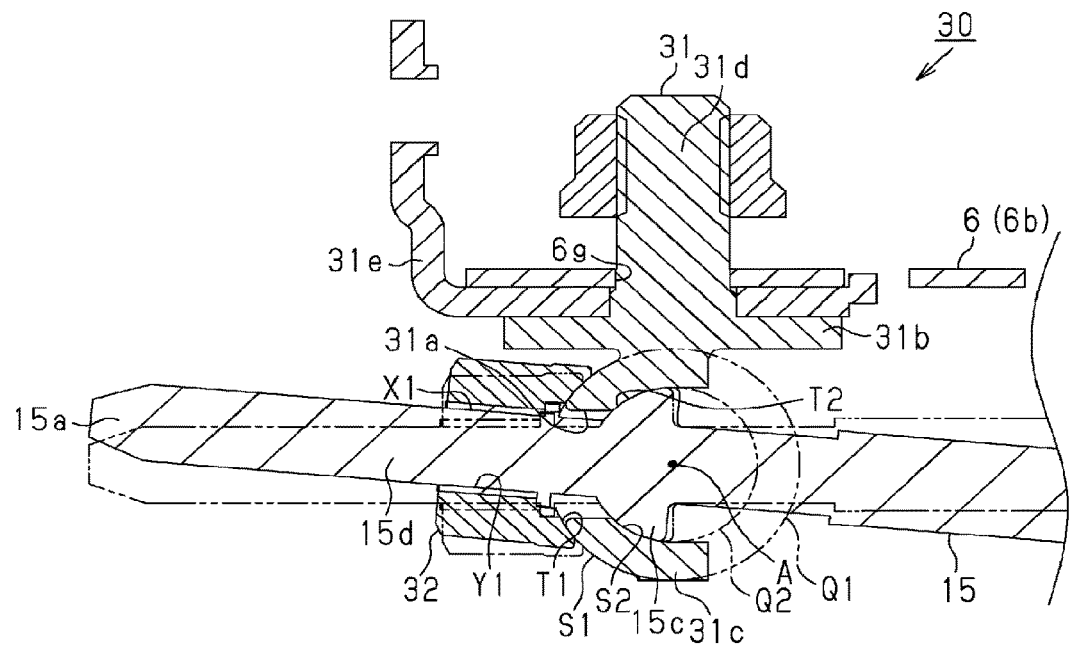
FIG. 6 is a sectional view of a support.

Specifically, as illustrated in FIG. 6, the holding member 31 includes a fixing portion 31b that is fixed to the upper wall portion 6b of the upper rail 6, and the insertion-hole forming portion 31c that is disposed below the fixing portion 31b, inside the upper rail 6. In addition, the insertion-hole forming portion 31c has a substantially bowl shape having a first curved surface S1 formed of a convex-curved surface facing the front side of the upper rail 6 and a second curved surface S2 formed of a concave-curved surface facing the rear side of the upper rail 6. The insertion hole 31a, into which the screw rod 15 described above is inserted, is provided in a bottom portion of the bowl shape.

The holding member 31 of the embodiment is configured to be integral with a holding bracket 31e that supports the gear box 17 with a stud 31d used to fix the seat 1 to the upper rail 6 and with the front end portion 15a of the upper rail 6. The holding member 31 is configured to be fixed to the upper wall portion 6b in a state in which the stud 31d is inserted from the inside of the upper rail 6 into a fixing hole 6g provided in the upper wall portion 6b of the upper rail 6.

In addition, the bulging portion 15c and the screwing portion X1 of the screw rod 15 are provided on a non-threaded portion 15d of the screw rod 15 on the front end portion 15a side. The bulging portion 15c of the embodiment is formed to have a substantially hemispherical shape that is convex on the front end portion 15a side of the screw rod 15. The screwing portion X1 is provided on the front end portion 15a side of the screw rod 15 from the bulging portion 15c.

In other words, in the seat sliding device 8 of the embodiment, the screw rod 15 is inserted into the insertion hole 31a, and thereby the insertion-hole forming portion 31c of the holding member 31 is disposed between the screwing portion X1 and the bulging portion 15c in the axial direction of the screw rod 15. Further, the holding nut 32 described above is screwed in the screwing portion X1 from the front end portion 15a side of the screw rod 15. In this manner, the support 30 of the embodiment has a configuration in which, in a state in which the holding nut 32 comes into contact with the first curved surface S1 of the insertion-hole forming portion 31c, and the bulging portion 15c of the screw rod 15 comes into contact with the second curved surface S2 of the insertion-hole forming portion 31c, the insertion-hole forming portion 31c of the holding member 31 is pinched between the holding nut 32 and the bulging portion 15c of the screw rod 15.

As described above, in the seat sliding device 8 of the embodiment, the support 30 is disposed between the nut member 16 and the gear box 17, to be more specific, at a position closer to the gear box 17 than to the nut member 16, in the axial direction of the screw rod 15. In addition, in the seat sliding device 8 of the embodiment, the bulging portion 15c of the screw rod 15, the insertion-hole forming portion 31c of the holding member 31, and the holding nut 32 are disposed in this order from the rear end portion 15b to the front end portion 15a (from the right side to the left side in FIG. 6) in the axial direction of the screw rod 15. In the support 30 of the embodiment, the bulging portion 15c of the screw rod 15 configures the pinch portion, and the insertion-hole forming portion 31c of the holding member 31 configures the pinch target portion.

Specifically, in the screw rod 15 of the embodiment, the bulging portion 15c thereof is disposed inside the insertion-hole forming portion 31c having the substantially bowl shape. In addition, the second curved surface S2 of the insertion-hole forming portion 31c is configured to form a part of a spherical surface Q2 with a point A illustrated in FIG. 6 as the center. The bulging portion 15c of the embodiment has an external shape of a substantially hemispherical shape such that a second contact portion T2 forms, with respect to the second curved surface S2, a curved surface shape along the second curved surface S2.

Further, the first curved surface S1 of the insertion-hole forming portion 31c of the embodiment is configured to form a part of a spherical surface Q1 with the point A as the center. In other words, the insertion-hole forming portion 31c of the embodiment has a configuration in which the first curved surface S1 and the second curved surface S2 configure a part of the spherical surfaces Q1 and Q2 which are concentric with each other. The holding nut 32 of the embodiment is provided with a first contact portion T1 with respect to the first curved surface S1, which has a curved surface shape along the first curved surface S1.

In the configuration described above, in the support 30 of the embodiment, the insertion-hole forming portion 31c of the holding member 31 and the holding nut 32 slide along the first curved surface S1, and the insertion-hole forming portion 31c and the bulging portion 15c provided on the screw rod 15 slide along the second curved surface S2. In this manner, it is possible to allow the screw rod 15 to tilt with the point A, which is the center of the first curved surface S1 and the second curved surface S2, as the fulcrum.

As described above, according to the embodiment, it is possible to achieve such effects.

(1) The seat sliding device 8 includes the support 30 that supports the intermediate portion of the screw rod 15 by the upper rail 6. The support 30 includes the holding member 31 that is provided with the insertion hole 31a into which the screw rod 15 is inserted and that is fixed to the upper rail 6, and the holding nut 32 that is provided with the through-hole Y1 (screwing hole) into which the screw rod 15 is inserted and that is screwed to the screwing portion X1 provided on the screw rod 15. In addition, the holding nut 32 is configured to pinch the insertion-hole forming portion 31c of the holding member 31 in cooperation with the bulging portion 15c provided on the screw rod 15. Further, the insertion-hole forming portion 31c has the first curved surface S1 that comes into contact with the holding nut 32 in a slidable manner and the second curved surface S2 that comes into contact with the bulging portion 15c of the screw rod 15 in a slidable manner. The first curved surface S1 and the second curved surface S2 are configured to form a part of the spherical surfaces Q1 and Q2 that are concentric with each other.

In the configuration described above, it is possible for the support 30 to receive a load in an axial direction of the screw rod 15. In addition, the load in the axial direction is transmitted from the upper rail 6 to the screw rod 15 via the holding member 31 pinched between the bulging portion 15c of the screw rod 15 and the holding nut 32 that is screwed to the screw rod 15. In this manner, at the time of forward collision of the vehicle or the like, it is possible to distribute the load generated when the upper rail 6 biased on the front side presses the rear end portion 15b of the screw rod 15 via the bearing member 19 described above.

In addition, the insertion-hole forming portion 31c of the holding member 31 and the holding nut 32 slide along the first curved surface S1, and the insertion-hole forming portion 31c and the bulging portion 15c of the screw rod slide along the second curved surface S2. In this manner, the screw rod 15 is allowed to tilt with the center position (point A) of the spherical surface, a part of which is configured of the first curved surface S1 and the second curved surface S2, as a fulcrum. In this manner, it is possible to reduce generation of a biased load due to the tilt of the screw rod 15 in the support.

Further, the insertion-hole forming portion 31c is configured to be pinched between the holding nut 32 and the bulging portion 15c of the screw rod 15, and thereby it is possible to adjust play thereof based on tightening force of the holding nut 32.

(2) The holding nut 32 has a configuration in which the first contact portion T1 with respect to the first curved surface S1 of the insertion-hole forming portion 31c has the curved surface shape along the first curved surface S1.

In the configuration described above, the holding nut 32 comes into even contact with the first curved surface S1 provided on the insertion-hole forming portion 31c of the holding member 31. In this manner, the holding nut 32 and the bulging portion 15c of the screw rod 15 can more smoothly slide along the second curved surface S2.

(3) The bulging portion 15c of the screw rod 15 has a configuration in which the second contact portion T2 provided with respect to the second curved surface S2 of the insertion-hole forming portion 31c has the curved surface shape along the second curved surface S2.

In the configuration described above, the bulging portion 15c of the screw rod 15 comes into even contact with the second curved surface S2 provided on the insertion-hole forming portion 31c of the holding member 31. In this manner, the insertion-hole forming portion 31c of the holding member 31 and the bulging portion 15c of the screw rod 15 can more smoothly slide along the second curved surface S2.

The embodiment described above may be modified as follows.

Figure 7:
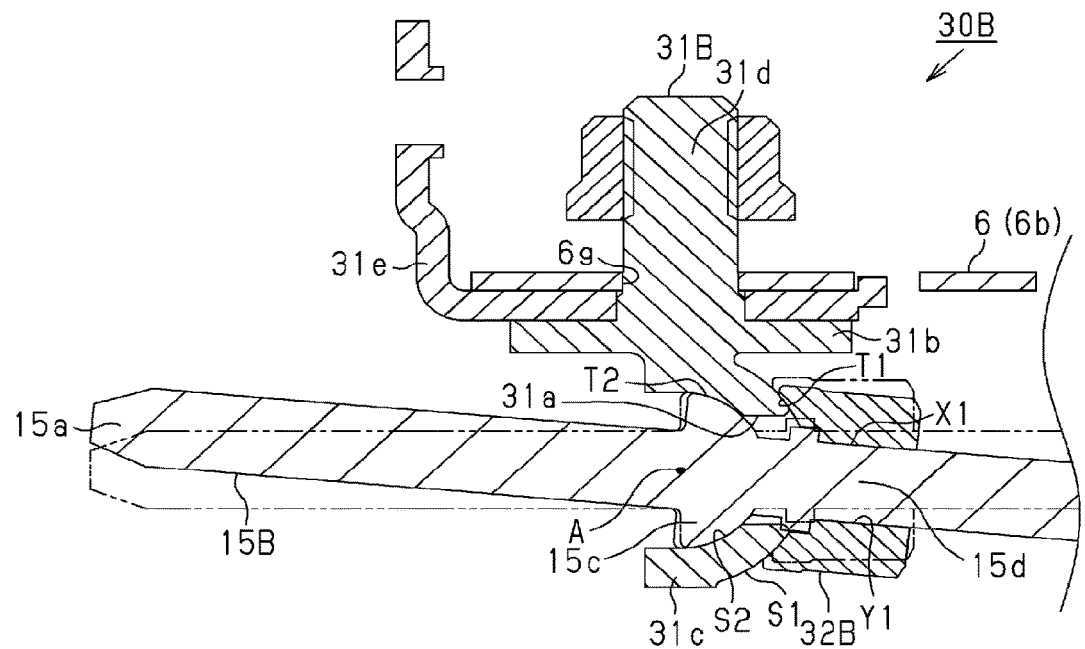
FIG. 7 is a sectional view of another support.

As illustrated in FIG. 7, a support 30B may have a configuration in which a holding nut 32B, the insertion-hole forming portion 31c of a holding member 31B, and the bulging portion 15c of a screw rod 15B are disposed in this order from the rear end portion 15b to the front end portion 15a (from the right side to the left side in FIG. 7) in the axial direction of the screw rod 15B.

In this case, the insertion-hole forming portion 31c of the holding member 31B has a configuration in which the first curved surface S1 formed of a convex-curved surface faces the rear end portion 15b side (right side in FIG. 7) of the upper rail 6 and the second curved surface S2 formed of a concave-curved surface faces the front end portion 15a side of the upper rail 6. The bulging portion 15c of the screw rod 15B is configured to have the hemispherical shape that is convex on the rear end portion 15b side of the screw rod 15B. Also in such a configuration, it is possible to achieve the same effects as those in the embodiment described above.

In addition, the insertion-hole forming portion 31c of the holding member 31 may have a configuration in which the first curved surface S1 has the concave-curved surface and the second curved surface S2 has the convex-curved surface. In this case, the first contact portion T1 on the holding nut 32 side may have a hemispherical shape or the like.

Figure 8:
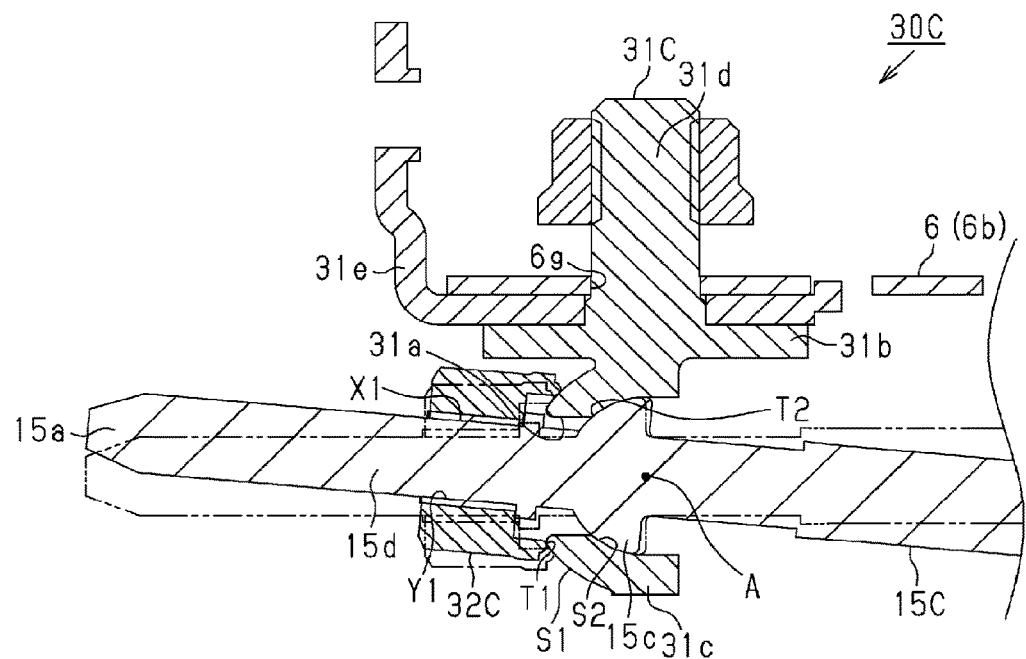
FIG. 8 is a sectional view of still another support.

As illustrated in FIG. 8, a support 30C of the embodiment described above may not necessarily have the first contact portion T1 of a holding nut 32C, which has the curved surface shape (refer to FIG. 6) along the first curved surface S1 provided on the insertion-hole forming portion 31c of the holding member 31C on the screw rod 15C.

For example, the first contact portion T1 of the holding nut 32C with respect to the first curved surface S1 provided on the insertion-hole forming portion 31c may have a shape tapered toward a distal end thereof. In this manner, it is possible to reduce a contact surface with the first curved surface S1. As a result, the insertion-hole forming portion 31c and the holding nut 32C can more smoothly slide along the first curved surface S1.

In the embodiment described above, the bulging portion 15c provided on the screw rod 15 is provided with the second contact portion T2 with respect to the second curved surface S2, which has a hemispherical shape along the second curved surface S2. However, the shape is not limited thereto, and also for the second contact portion T2 on the bulging portion 15c side, the shape may not be the curved surface shape along the second curved surface S2, such as having a plurality of protrusions that come into contact with the second curved surface S2 in a slidable manner.

In the embodiment, the bulging portion 15c of the screw rod 15 configures the pinch portion in the support 30, and the insertion-hole forming portion 31c of the holding member 31 configures the pinch target portion. However, the configuration is not limited thereto, and the insertion-hole forming portion 31c of the holding member 31 may configure the pinch portion and the bulging portion 15c of the screw rod 15 may configure the pinch target portion.

Figure 9:
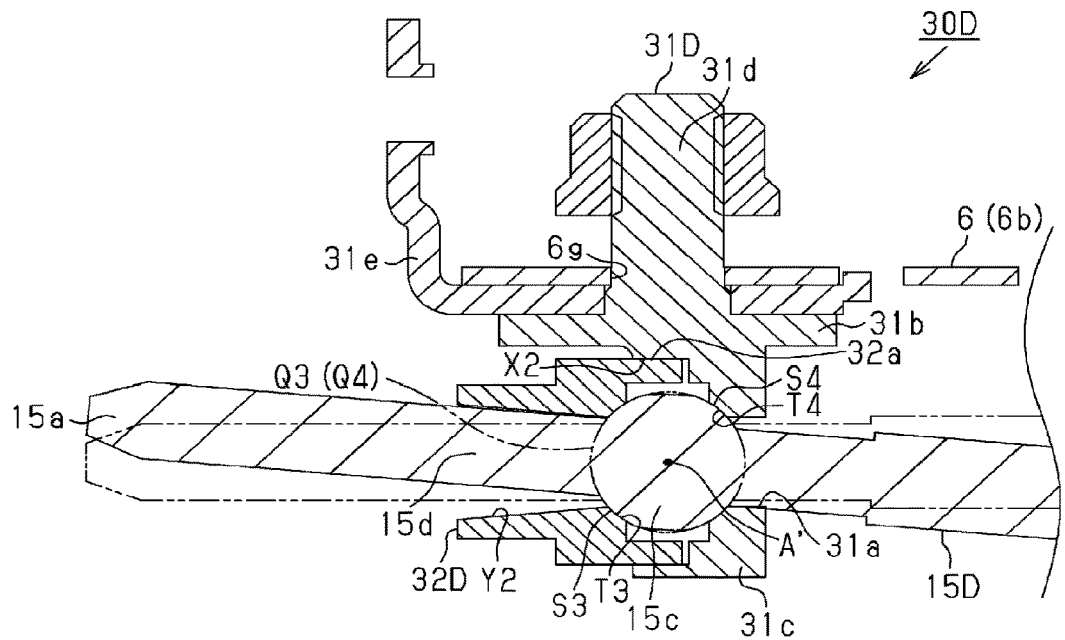
FIG. 9 is a sectional view of still another support.

For example, as illustrated in FIG. 9, in a support 30D, the insertion-hole forming portion 31c of a holding member 31D, the bulging portion 15c of a screw rod 15D, and a holding nut 32D, are disposed in this order from the rear end portion 15b to the front end portion 15a (from the right side to the left side in FIG. 9) in the axial direction of the screw rod 15D.

The bulging portion 15c as the pinch target portion has a first curved surface S3 that comes into contact with the holding nut 32D and a second curved surface S4 that comes into contact with the holding member 31D. The first curved surface S3 is formed of the convex-curved surface facing the front end portion 15a side in the axial direction, and the second curved surface S4 is formed of the convex-curved surface facing the rear end portion 15b side (right side in FIG. 9) in the axial direction. The bulging portion 15c of the screw rod 15D illustrated in FIG. 9 has a substantially spherical external shape. The bulging portion 15c also has a configuration in which the first curved surface S3 and the second curved surface S4 form a part of spherical surfaces Q3 and Q4 that are concentric with each other, with a point A' in the figure as the center.

The insertion-hole forming portion 31c as the pinch portion is provided with a screwing portion X2 in which the holding nut 32D is screwed. Specifically, in an example illustrated in FIG. 9, the holding nut 32D has a threaded portion 32a on an outer circumferential surface thereof. The holding nut 32D is not provided with a threaded portion in an inner circumferential surface of a through-hole Y2 in which the screw rod 15D is inserted. In addition, the screwing portion X2 on the insertion-hole forming portion 31c side has a hole shape inside which female threads are formed. The insertion hole 31a is formed in the bottom portion having the hole shape.

In other words, in the support 30D illustrated in FIG. 9, the bulging portion 15c of the screw rod 15D is pinched between the insertion-hole forming portion 31c of the holding member 31D and the holding nut 32D that is screwed in the screwing portion X2 of the insertion-hole forming portion 31c. The first contact portion T3 of the holding nut 32D with respect to the first curved surface S3 has a curved surface shape along the first curved surface S3, and the second contact portion T4 of the insertion-hole forming portion 31c provided with respect to the second curved surface S4 has a curved surface shape along the second curved surface S4.

Also in such a configuration, it is possible to achieve the same effects as those in the embodiment described above. Additionally, since the pinch portion and the pinch target portion are configured to have a simple shape, it is easy to perform the manufacturing.

In the embodiment, the nut member 16 is fixed to the lower rail 5, and the screw rod 15 is supported by the upper rail 6. However, the embodiment is not limited thereto, and the supports 30 and 30B to 30D described in the embodiment described above and in the other examples may be applied to a configuration in which the nut member 16 is fixed to the upper rail 6, and the screw rod 15 is supported by the lower rail 5.

In the embodiment, the support 30 is positioned between the nut member 16 and the gear box 17 in the axial direction of the screw rod 15; however, the position of the support 30 may be arbitrarily changed. For example, the support may be disposed at a position closer to the nut member 16 than to the gear box 17. Further, a drive position of the screw rod 15 by the gear box 17 may also be arbitrarily changed such as setting the position on the rear end portion 15b side. A support structure of the screw rod 15 at an end portion in the axial direction may also be arbitrarily changed.

The lower rail 5 may be configured to be fixed to the floor F via the bracket and may be configured to be directly fixed to the floor F by using a fastening member such as a bolt.

It is preferable that a vehicle seat sliding device according to an aspect of this disclosure includes: a lower rail that is fixed to a vehicle floor; an upper rail that slidably engages with the lower rail and supports a vehicle seat upward; a nut member fixed to a first rail which configures one side of the lower rail and the upper rail; a screw rod that is screwed into the nut member; a drive unit that rotates the screw rod; and a support that supports the screw rod on a second rail which configures the other side of the lower rail and the upper rail. The support includes a holding member that is provided with an insertion hole into which the screw rod is inserted and that is fixed to the second rail, and a holding nut that is provided with a through-hole into which the screw rod is inserted and that is screwed to a screwing portion provided on the screw rod or the holding member. The holding nut is configured to pinch, in cooperation with a pinch portion provided on one side of the screw rod and the holding member which have the screwing portion, a pinch target portion provided on the other side of the screw rod and the holding member. The pinch target portion has a first curved surface that comes into contact with the holding nut in a slidable manner, and a second curved surface that comes into contact with the pinch portion in a slidable manner. The first curved surface and the second curved surface are configured to form a part of spherical surfaces that are concentric with each other.

According to this configuration, it is possible for the support to receive a load in an axial direction of the screw rod. In addition, the pinch target portion and the holding nut slide along the first curved surface, and the pinch target portion and the pinch portion slide along the second curved surface. In this manner, the screw rod is allowed to tilt with the center position of the spherical surface, a part of which is configured of the first curved surface and the second curved surface, as a fulcrum. In this manner, it is possible to reduce generation of a biased load due to the tilt of the screw rod in the support.

In the vehicle seat sliding device according to the aspect of this disclosure, it is preferable that the pinch target portion is provided on the holding member, and one of the first curved surface and the second curved surface forms a convex-curved surface, and the other one of the first curved surface and the second curved surface forms a concave-curved surface.

According to this configuration, in a case where a part of the holding member is the pinch target portion, and the pinch target portion is pinched between the holding nut and the pinch portion provided on the screw rod side, it is possible to employ a configuration in which the pinch target portion and the holding nut slide along the first curved surface, and the pinch target portion and the pinch portion slide along the second curved surface.

In the vehicle seat sliding device according to the aspect of this disclosure, it is preferable that the pinch target portion is provided on the screw rod, the first curved surface forms a convex-curved surface toward one end of the screw rod in an axial direction thereof, and the second curved surface forms a convex-curved surface toward the other end of the screw rod in the axial direction thereof.

According to this configuration, in a case where a part of the screw rod is the pinch target portion, and the pinch target portion is pinched between the holding nut and the pinch portion provided on the holding member side, it is possible to employ a configuration in which the pinch target portion and the holding nut slide along the first curved surface, and the pinch target portion and the pinch portion slide along the second curved surface. Additionally, since the pinch portion and the pinch target portion are configured to have a simple shape, it is easy to perform the manufacturing.

In the vehicle seat sliding device according to the aspect of this disclosure, it is preferable that the holding nut is provided with a first contact portion with respect to the first curved surface, which has a curved surface shape along the first curved surface.

According to this configuration, the holding nut comes into even contact with the first curved surface of the pinch target portion. In this manner, the pinch target portion and the holding nut can more smoothly slide along the first curved surface.

In the vehicle seat sliding device according to this disclosure, it is preferable that the pinch portion is provided with a second contact portion with respect to the second curved surface, which has a curved surface shape along the second curved surface.

According to this configuration, the pinch portion comes into even contact with the second curved surface of the pinch target portion. In this manner, the pinch target portion and the pinch portion can more smoothly slide along the second curved surface.

In the vehicle seat sliding device according to the aspect of this disclosure, it is preferable that the support includes the pinch portion, the pinch target portion, and the holding nut in this order from a rear side to a front side of the vehicle seat in an axial direction of the screw rod.

In the vehicle seat sliding device according to the aspect of this disclosure, it is preferable that the support is disposed between the nut member and the drive unit in an axial direction of the screw rod.

According to the aspect of this disclosure, it is possible to reduce the biased load generated in the screw rod and it is possible to secure a smoother operation.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle seat sliding device comprising:
 a lower rail that is fixed to a vehicle floor;
 an upper rail that slidably engages with the lower rail and supports a vehicle seat upward;
 a nut member fixed to a first rail which configures one side of the lower rail and the upper rail;
 a screw rod that is screwed into the nut member;
 a drive unit that rotates the screw rod; and
 a support that supports the screw rod on a second rail which configures the other side of the lower rail and the upper rail,
 wherein the support includes
  a holding member that is provided with an insertion hole into which the screw rod is inserted and that is fixed to the second rail, and
  a holding nut that is provided with a through-hole into which the screw rod is inserted and that is screwed to a screwing portion provided on the screw rod or the holding member,
 the holding nut is configured to pinch, in cooperation with a pinch portion provided on one side of the screw rod and the holding member which have the screwing portion, a pinch target portion provided on the other side of the screw rod and the holding member,
 the pinch target portion has a first curved surface that comes into contact with the holding nut in a slidable manner, and a second curved surface that comes into contact with the pinch portion in a slidable manner, and the first curved surface and the second curved surface are configured to form a part of spherical surfaces that are concentric with each other.

2. The vehicle seat sliding device according to claim 1, wherein the pinch target portion is provided on the holding member, and one of the first curved surface and the second curved surface forms a convex-curved surface, and the other one of the first curved surface and the second curved surface forms a concave-curved surface.

3. The vehicle seat sliding device according to claim 1, wherein the pinch target portion is provided on the screw rod, the first curved surface forms a convex-curved surface toward one end of the screw rod in an axial direction thereof, and the second curved surface forms a convex-curved surface toward the other end of the screw rod in the axial direction thereof.

4. The vehicle seat sliding device according to claim 1, wherein the holding nut is provided with a first contact portion with respect to the first curved surface, which has a curved surface shape along the first curved surface.

5. The vehicle seat sliding device according to claim 1, wherein the pinch portion is provided with a second contact portion with respect to the second curved surface, which has a curved surface shape along the second curved surface.

6. The vehicle seat sliding device according to claim 1, wherein the support includes the pinch portion, the pinch target portion, and the holding nut in this order from a rear side to a front side of the vehicle seat in an axial direction of the screw rod.

7. The vehicle seat sliding device according to claim 1, wherein the support is disposed between the nut member and the drive unit in an axial direction of the screw rod.

* * * * *